US008189006B1

(12) United States Patent
Cook

(10) Patent No.: US 8,189,006 B1
(45) Date of Patent: May 29, 2012

(54) CACHING ATTRIBUTES OF SURFACES WITHOUT GLOBAL PARAMETERIZATIONS

(75) Inventor: Robert L Cook, San Anselmo, CA (US)

(73) Assignee: Pixar, Emeryville, CA (US)

( * ) Notice: Subject to any disclaimer, the term of this patent is extended or adjusted under 35 U.S.C. 154(b) by 1157 days.

(21) Appl. No.: 11/861,634

(22) Filed: Sep. 26, 2007

Related U.S. Application Data

(60) Provisional application No. 60/827,273, filed on Sep. 28, 2006.

(51) Int. Cl.
*G09G 5/00* (2006.01)
(52) U.S. Cl. ........ 345/581; 345/582; 345/585; 345/606; 345/611
(58) Field of Classification Search .......... 345/581, 345/582, 585, 606, 611
See application file for complete search history.

(56) References Cited

U.S. PATENT DOCUMENTS

| | | | | |
|---|---|---|---|---|
| 5,903,273 A * | 5/1999 | Mochizuki et al. | ........... | 345/423 |
| 6,222,553 B1 * | 4/2001 | DeRose et al. | ................ | 345/423 |
| 6,448,968 B1 * | 9/2002 | Pfister et al. | .................. | 345/423 |
| 6,553,337 B1 * | 4/2003 | Lounsbery | ........................ | 703/2 |
| 6,583,787 B1 * | 6/2003 | Pfister et al. | .................. | 345/441 |
| 7,227,545 B2 * | 6/2007 | Maillot et al. | ................ | 345/423 |

* cited by examiner

*Primary Examiner* — Jeffrey Chow
(74) *Attorney, Agent, or Firm* — Kilpatrick Townsend & Stockton LLP; Philip H. Albert

(57) ABSTRACT

Surfaces without a global surface coordinate system are divided into surface regions having local surface coordinate systems to enable the caching of surface attribute values. Surface attribute functions are evaluated to determine surface attribute values for the surface regions. A surface attribute value for a surface region may include contributions from two or more adjacent surfaces. A multiresolution cache stores surface attribute values at different resolution levels for surface regions of one or more surfaces, which may be discontiguous. Surface attribute values for a surface are retrieved from the multiresolution cache by dividing the surface into surface regions at a desired resolution level and selecting a corresponding resolution level of the multiresolution cache. One or more cached surface attribute values are retrieved for each surface region. Surface attribute values can be artistically or procedurally generated and can specify surface attributes including optical, illumination, animation, simulation, modeling, or rendering attributes.

11 Claims, 9 Drawing Sheets

| A01 | A10 564 | B01 562 | B10 | C01 | C10 |
|---|---|---|---|---|---|
| A00 | A11 566 | B00 | B11 | C00 | C11 |

560

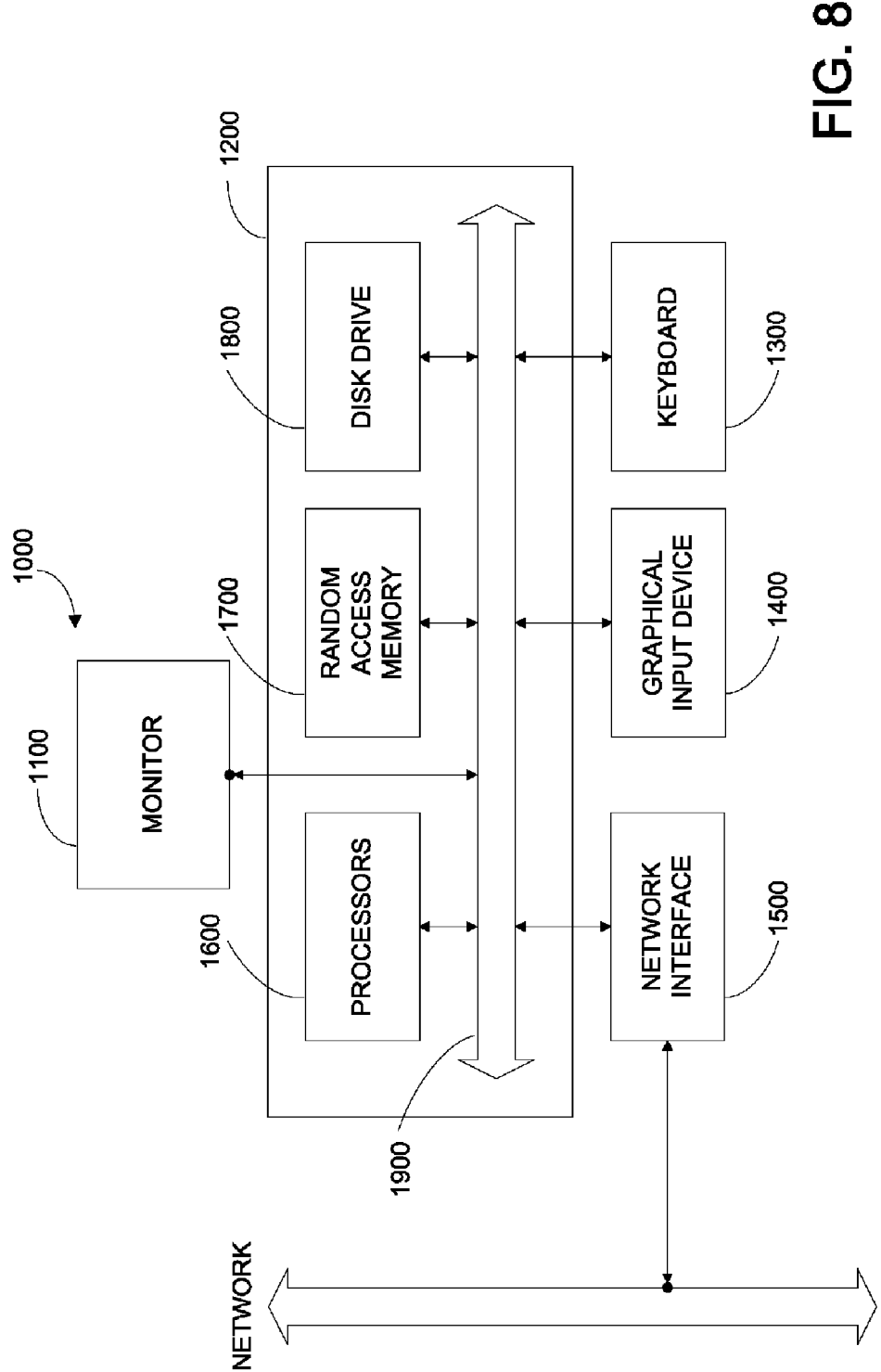

CACHING ATTRIBUTES OF SURFACES WITHOUT GLOBAL PARAMETERIZATIONS

CROSS-REFERENCE TO RELATED APPLICATIONS

This application claims priority to U.S. Provisional Patent Application No. 60/827,273, filed Sep. 28, 2006, which is incorporated by reference herein for all purposes. This patent application is related to U.S. Pat. No. 6,037,949, issued Mar. 14, 2000, and entitled "Texture mapping and other uses of scalar fields on subdivision surfaces in computer graphics and animation"; U.S. Pat. No. 6,222,553, issued Apr. 24, 2001, and entitled "Hybrid subdivision in computer graphics"; and U.S. Pat. No. 6,489,960, issued Dec. 3, 2002, and entitled "Hybrid subdivision in computer graphics." These related patents are incorporated by reference herein for all purposes.

BACKGROUND OF THE INVENTION

The present invention relates to the field of computer graphics, and in particular to methods and apparatus for optimizing the evaluation of functions associated with surfaces. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Surface attribute functions can define the values of attributes of surfaces in three-dimensional space. Surface attribute functions can be evaluated at any point on the surface to provide corresponding attribute values at that point on the surface. Attributes of surfaces can include optical properties of a surface, such as color, transparency, reflectivity, and refractivity. Attributes can also include visibility or occlusion information; artistically or procedurally generated texture data in one, two, three, or more dimensions; noise functions in one, two, three, or more dimensions, which can be used to procedurally generate or modify other surface attributes; shadow generation information; forces or attributes used for physics, cloth, fluid, or other types of simulations; animation data, which can be used to specify motion of entities associated with a surface point, such as fur or hair; modeling parameters, such as the density of procedurally generated grass applied to a model of a landscape; illumination information, which specifies the amount and direction of light on the surface point from other portions of the scene; and rendering information, such as ray tracing path information or radiosity rendering information. Functions can be relatively simple, such as looking up texture data from a texture map, or very complex, such as the evaluation of complex user-defined shader programs, ray tracing programs, animation or modeling programs, or simulation programs.

An application such as a rendering, animation, or simulation application determines the attribute values of a given surface point by evaluating the associated surface attribute functions. Typically, this evaluation requires the specification of the position of the given surface point using surface coordinates. For attributes values that remain fixed to surface points regardless of the surface's pose (or position, orientation, and shape), attribute values for surface points can be cached or stored. This eliminates redundant evaluations of surface attribute functions and decreases the time required for rendering or other operations utilizing surface point attribute values.

Surfaces for three-dimensional models are defined by mathematical relationships. The mathematics defining some types of surfaces, such as polygons and bicubic patches, have a natural global surface coordinate system. The global surface coordinate system enables the position of any surface point to be specified as a set of numerical values, such as a pair of coordinates values (u,v).

The mathematics defining other types of surfaces do not include a global surface coordinate system. For these surfaces, there is no coordinate system within or on the surface itself that can define the position of any surface point as a set of numerical values. Examples of these types of surfaces include subdivision surfaces, implicit surfaces, and fractal surfaces.

Subdivision surfaces can create piecewise smooth surfaces out of arbitrary meshes of points. From an initial mesh of points, additional sets of points are added to provide additional surface detail and form a smoother surface, in a process referred to as refinement. The repeated application of refinement operations produces a hierarchy of progressively more detailed meshes, which ultimately converge at its limit to a subdivision surface. There are numerous subdivision surface refinement schemes that are well known in the art. Subdivision surfaces have many advantages in modeling three-dimensional objects, including modeling piecewise smooth surfaces of arbitrary topology and sharp features, edges, creases, and corners. However, because the surface is the result of the progressive refinement of a set of arbitrary meshes, there is no single surface coordinate system, or coordinate system located within the subdivision surface, that can specify the location of any given point on the subdivision surface.

Implicit surfaces are surfaces defined by an isosurface of a function of three or more dimensions. An isosurface is the set of function solutions having a constant, specified value. For example, if a function defines the pressure of fluid in a three-dimensional flow, an implicit surface can be specified as the set of function values in the three-dimensional flow having a given pressure value. Other types of functions can be used to define implicit surfaces, including the signed distance function often used to define level sets. With implicit surfaces, the implicit surface is deduced from the output of a more complex function of three or more dimensions. Because there is no explicit mathematical equation defining the implicit surface itself, there is no surface coordinate system, or coordinate system within the implicit surface, that can specify the location of any given point on the implicit surface.

Because some types of surfaces, including but not limited to subdivision surfaces, implicit surfaces, and fractal surfaces, do not have a natural global surface coordinate system, which is a coordinate system within or on the surface that is capable of specifying the location of any point on the surface as a set of numerical values, other techniques must be used to evaluate surface attribute functions.

For example, the position of a surface point can be determined in three-dimensional space. Using this three-dimensional position of a surface point, the surface attribute functions can be evaluated to determine the surface attribute values. Even if the attribute values are fixed to the surface, the surface attribute functions for a point on the surface must be evaluated repeatedly because the position of a surface point in three-dimensional space changes as the surface's pose changes, even if the relative location of the surface point within a surface remains unchanged. Additionally, surfaces are often sampled at a rate based on the viewpoint or camera parameters used to render a scene. As the camera or viewpoint changes, the surface points that are sampled and hence evaluated by surface attribute functions change as well. Thus, it is difficult to cache attributes of surface points for these surface types.

One prior approach caches surface attribute values for surfaces without global surface coordinate systems in a three dimensional data structure. In this approach, a data structure such as a voxel grid or brick map stores surface attribute values at the three-dimensional locations corresponding with the locations of their associated surface points. The three-dimensional data structures include significant amounts of empty space, corresponding to the three-dimensional space not occupied by the surface of an object. Even with compression schemes, these data structures require enormous amounts of memory and are difficult to use effectively.

Altasing is another prior approach that attempts to superimpose or project a global surface coordinate system over multiple surfaces that do not have their own surface coordinate system. The global coordinate system provided by atlasing schemes behaves poorly for complex surface topologies and at the seams between surfaces, having numerous gaps, discontinuities, and inconsistencies.

It is therefore desirable for a system and method to enable caching of surface attribute values for surfaces without global surface coordinate systems. It is further desirable for the system and method to enable the retrieval of cached surface attribute values without reevaluating surface attribute functions. It is further desirable for the system and method to efficiently store cached surface attribute values with minimal wasted memory.

BRIEF SUMMARY OF THE INVENTION

An embodiment of the invention divides surfaces without a global surface coordinate system into surface regions having local surface coordinate system to enable the caching and retrieval of surface attribute values. Surface attribute functions are evaluated to determine surface attribute values for the surface regions. A surface attribute value for a surface region can include the contribution of the surface attribute function to one, two, or more adjacent surfaces. A multiresolution cache stores surface attribute values at different resolution levels for surface regions of one or more surfaces, which may be discontiguous. Surface attribute values for a surface are retrieved from the multiresolution cache by dividing the surface into surface regions at a desired resolution level. A corresponding resolution level of the multiresolution cache is selected and one or more cached surface attribute values are retrieved for each surface region. Surface attribute values can be artistically or procedurally generated or generated from a renderering operation and can include optical, illumination, animation, simulation, modeling, or rendering attributes.

In an embodiment, a method of caching a value of a function at a plurality of surface points comprises dividing a first surface portion of at least one surface into a first plurality of surface regions at a first resolution level and dividing the first surface portion into a second plurality of surface regions at a second resolution level. The method further comprises evaluating a function to determine a surface attribute value for each of the first plurality of surface regions and evaluating the function to determine a surface attribute value for each of the second plurality of surface regions. The surface attribute values for the first and second plurality of surface regions are stored in a first portion and second portions of a multiresolution cache, respectively. Each of the first and second pluralities of surface regions include a separate local surface coordinate system and the first surface portion does not include a global surface coordinate system.

In a further embodiment, dividing the first surface portion into the first plurality of surface regions comprises an ordering scheme adapted to specify the first plurality of surface regions in a consistent order. The surface attribute values for the first plurality of surface regions are stored in storage locations corresponding with the consistent order.

In an additional embodiment, the method applies a filtering function having a filter area to each of the surface regions, wherein the filtering function is adapted to combine surface attribute values from the function within the filter area. In yet a further embodiment, the filter area includes surface attribute values for at least one surface region associated with at least two adjacent surfaces.

Embodiments of the first surface portion can include a subdivision hierarchy of meshes converging at its limit to a subdivision surface, an implicit surface defined by an isosurface of a second function, and a fractal surface. Further embodiments of the first surface portion can include a single surface or multiple surfaces. The multiple surfaces may be discontiguous.

BRIEF DESCRIPTION OF THE DRAWINGS

The invention will be described with reference to the drawings, in which:

FIG. 8 illustrates an example computer system suitable for implementing an embodiment of the invention.

DETAILED DESCRIPTION OF THE INVENTION

Figure 1:
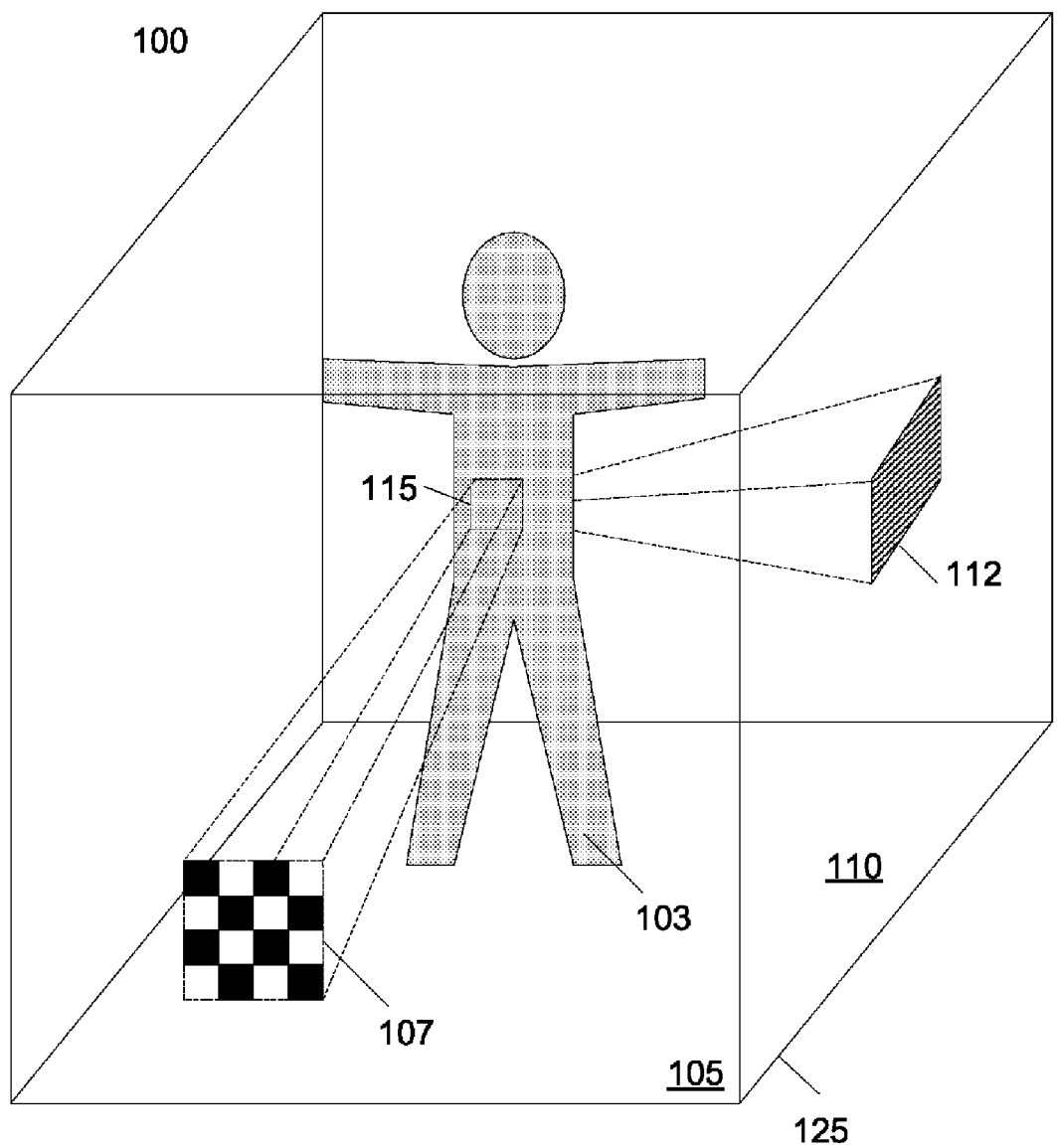
FIG. 1 illustrates an example application of a surface attribute function.

FIG. 1 illustrates an example application of a surface attribute function 100 to a three-dimensional model 103. Example surface attribute function 100 is a projection paint function. A projection paint function can be used to apply surface color attributes, for example in the form of texture maps, to a three-dimensional model 103. The three-dimensional model can be defined using any technique known in the art for representing three-dimensional objects, including surfaces without a global surface coordinate system, such as subdivision surfaces, implicit surfaces, and fractal surfaces.

In example surface attribute function 100, a set of views 125 of a three-dimensional model 103 in an initial or rest pose is provided. For example, the set of views 125 includes front view 105 and side view 110 of model 103. Typically, the set of views 125 includes at least six views of model 103. The set of views 125 can include additional views arranged such that every portion of the model 103 is visible from at least one of the set of views 125. The model 103 may also be posed in additional poses, referred to as reference poses, to ensure that every portion of the model 103 is visible from at least one of the set of views 125.

For each view, an image specifies surface color values for at least a portion of the model visible from the view. For example, image 107 specifies surface color values for view 105 of the model 103. Similarly, image 112 specifies surface color values for view 110 of the model 103. An artist or other user can define images for each view using any technique for creating two-dimensional images known in the art, including the use of image editing applications. Each pixel or other portion of an image in a view specifies the surface color of a corresponding surface of the model 103 as projected into that view. For example, portion 115 of model 103 as projected into view 105 corresponds with image 107. Additionally, each view can include a shadow or depth map specifying the distance of the surface of the model 103 relative to the viewpoint associated with each view. The depth map is used to determine occlusion of other surfaces of model 103 that are not visible from its associated view.

Figure 2:
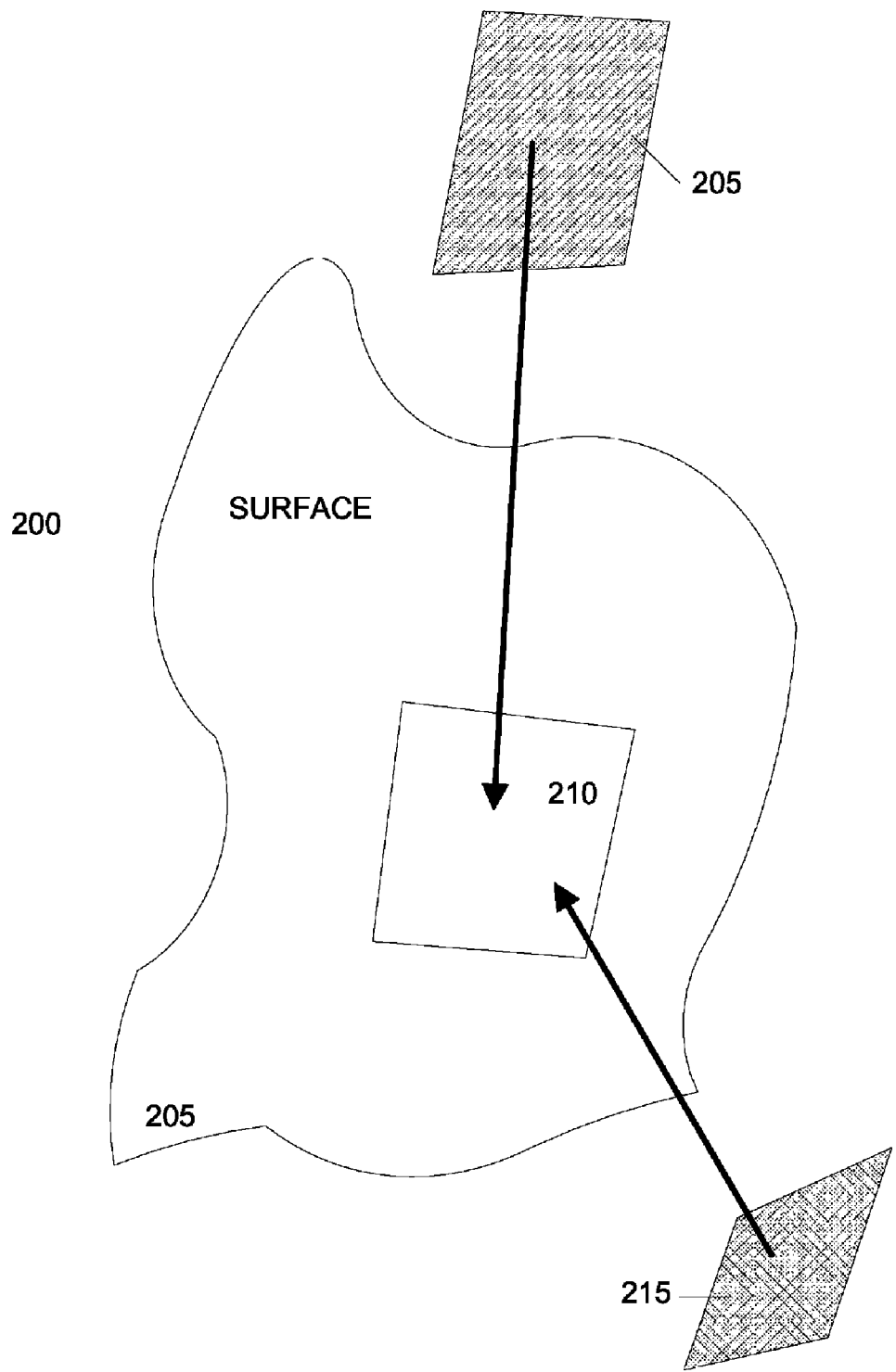
FIG. 2 illustrates a prior method for evaluating a example projection paint function for a surface without a global surface coordinate system.

During rendering, the model is posed from its rest pose to a desired pose. FIG. 2 illustrates a prior method 200 for evaluating a example projection paint function for a surface 205 without a global surface coordinate system. The surfaces of model 103 in the desired pose, such as surface 205, are divided or partitioned into small surface regions, such as sub-pixel size micropolygons or other samples of a surface. Surface region 210 is an example of these surface regions. The position of surface region 210 in three-dimensional space is determined.

Each surface region, such as surface region 210, includes transformation information that specifies a transformation from the position of the surface region in the desired pose to a corresponding position, in three-dimensional space, in the rest pose and any additional reference poses. The transformation information is applied to a surface region 210 to determine its corresponding positions in the rest pose and any additional reference poses.

For the rest pose and any additional reference poses, images from each view are projected onto surface region in its respective transformed positions. For example, image 215 and 205 are projected on to surface region 210. If the depth of the surface region relative to the associated view is greater than the corresponding value of the depth map, indicating that the surface region is occluded in this view, the image associated with this view is not included in the color values of the transformed surface region.

The color values of the projected images from each view of each reference or rest pose onto the transformed surface region are combined and blended. Color values from multiple views associated with the rest pose and any additional reference poses can be combined in blended in numerous different ways, including weighted or unweighted averages or more complex filtering operations. Additionally, a feathering operation can be applied to the projected images associated with different views to ensure that surface regions near the boundaries of two or more projected images do not show any visible seams or gaps. The color values of the surface region are the combination of projected color values for each view of each reference or rest pose onto the surface region.

Method 200 of evaluating projection paint functions, as well as other types of surface attribute functions, often must be repeated each time the surface is rendered. For example, the position of the surface point in three-dimensional space relative to the camera viewpoint changes as the surface's pose changes and/or the camera viewpoint changes. Many computer graphics and rendering operations sample, filter, or otherwise evaluate surface attribute functions based on the relative size of the surface attribute function when projected into the image plane of the camera viewpoint (or the size of a pixel or sub-pixel region when projected on to the surface). For example, a projection paint function may be sampled using a filter that is the size of a pixel in an image when projected into the image plane. As a surface changes its pose and/or the camera viewpoint changes, the sampling rate and filter used to evaluate a projection paint function changes. Thus, method 200 must be repeatedly evaluated to sample the surface attribute function with the appropriate sample rate and filter size as a surface is posed.

Figure 3:
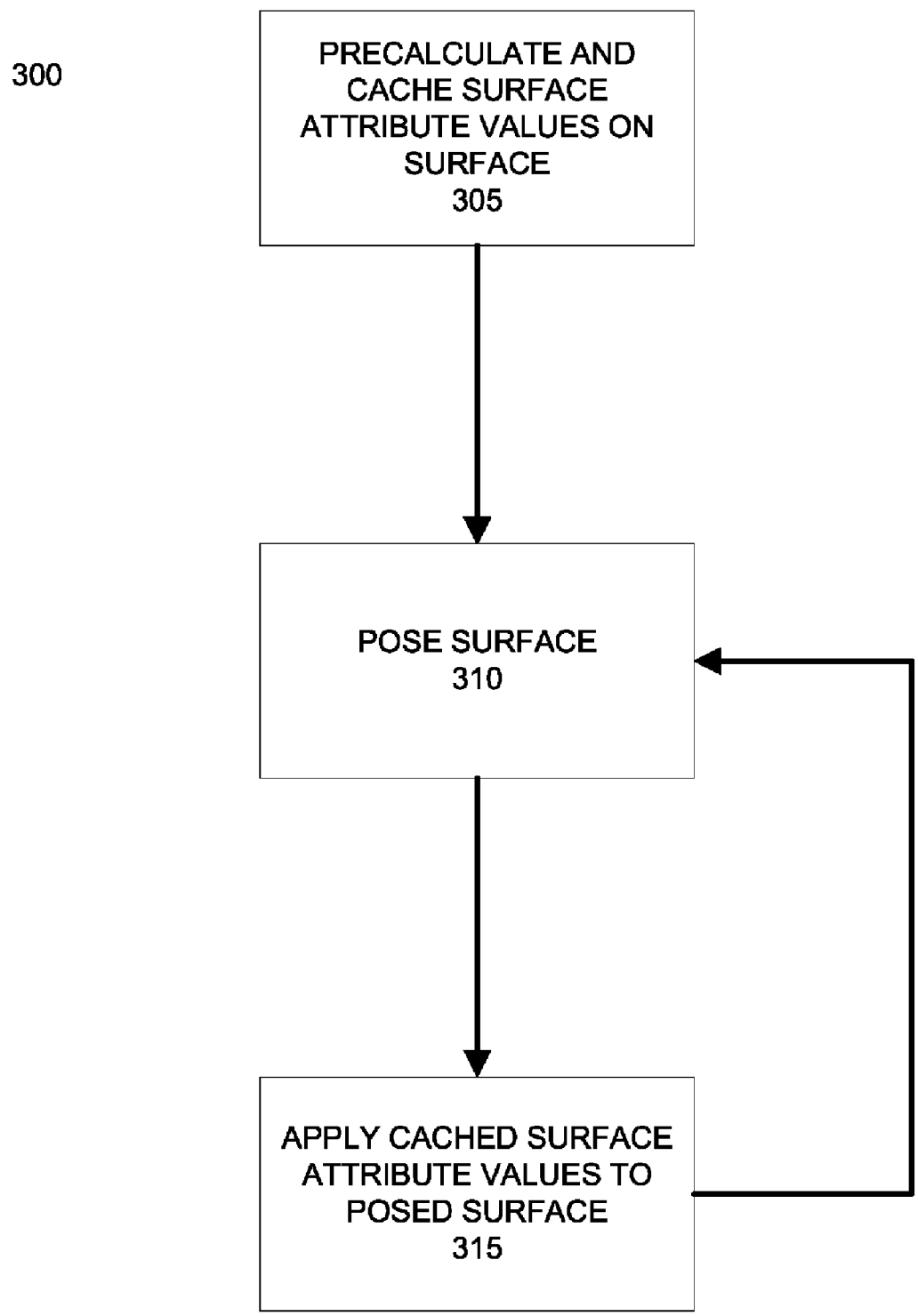
FIG. 3 illustrates a method of precalculating, caching, and reusing surface attribute values for a surface without a global surface coordinate system according to an embodiment of the invention.

FIG. 3 illustrates a method 300 of precalculating, caching, and reusing surface attribute values for a surface without a global surface coordinate system according to an embodiment of the invention. Method 300 enables surface attribute values for surfaces without a global surface coordinate system to be calculated once and then reused as needed during rendering or other operations, even if the surface is sampled at different rates.

Step 305 precalculates and caches surface attribute values for a surface. As discussed in detail below, the surface attribute values for a surface are stored in a multiresolution cache data structure. In step 310, the surface is placed into an arbitrary target pose. The target pose can be specified by animation variables, deformer functions, control points, or any other technique known in the art for specifying the position, orientation, and shape of surfaces.

Step 315 applies surface attribute values stored in the multiresolution cache to the posed surface. Step 315 and optionally step 310 can be repeated any number of times, reusing the surface attribute values stored in the multiresolution cache. The surface attribute values of the multiresolution cache will be valid as long as the outputs of the surface attribute function do not change for a surface. For example, a surface attribute function's values may be constant over an interval of time. Depending on the application, surface attribute values may be constant only within the time interval of a single frame or constant over a time interval of multiple frames. An additional embodiment can use cached surface attribute values to approximate a surface attribute function that changes only slightly over time between frames. In a further embodiment, a first surface attribute function can be analyzed to determine a subfunction with surface attribute values suitable for caching in the multiresolution cache. The cached subfunction surface attribute values can be reused together with one or more additional subfunctions to reconstruct the first surface attribute function.

Figure 4:
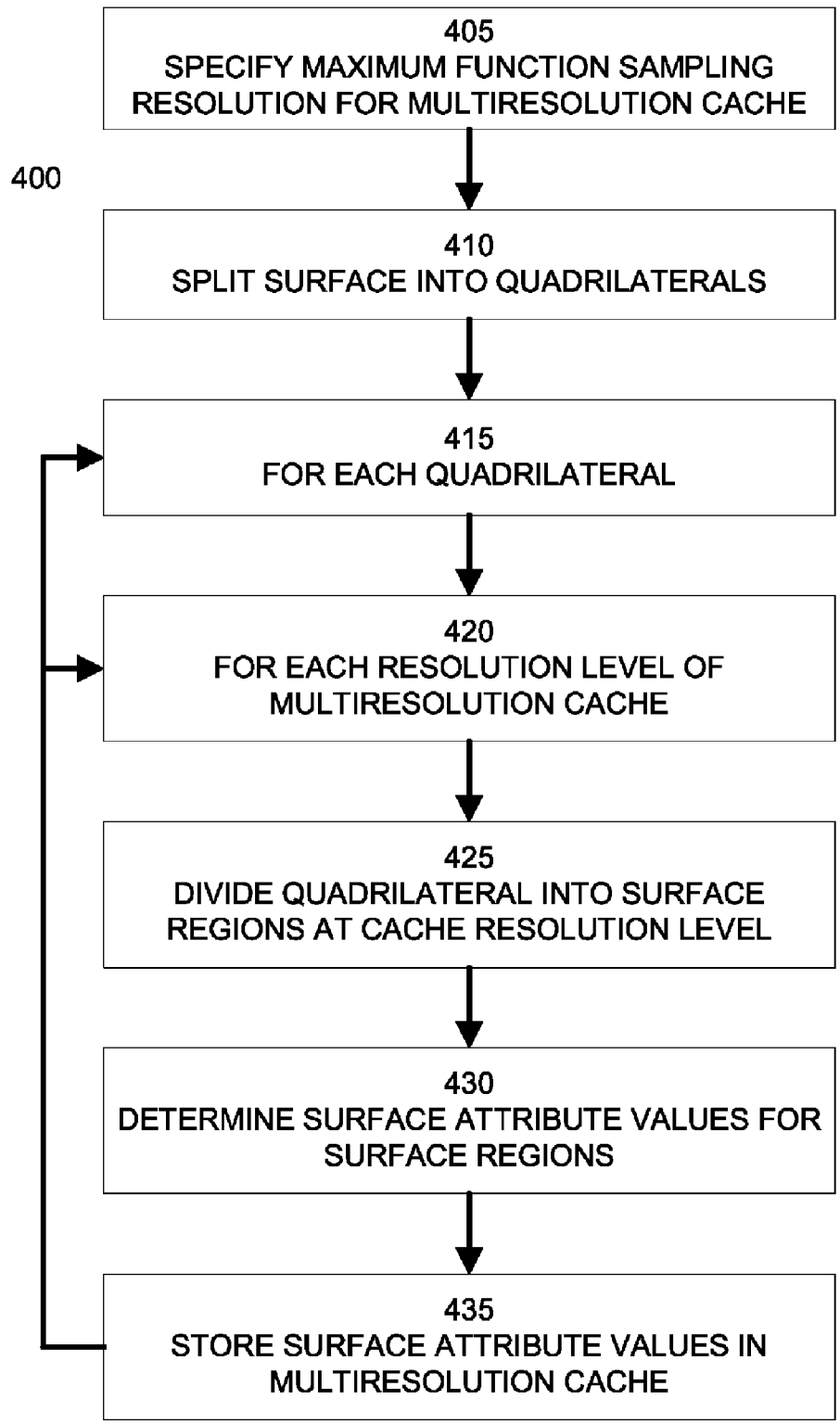
FIG. 4 illustrates a method of precalculating and caching surface attribute values for a surface without a global surface coordinate system according to an embodiment of the invention.

FIG. 4 illustrates a method 400 of precalculating and caching surface attribute values for a surface without a global surface coordinate system according to an embodiment of the invention. Step 405 specifies a maximum sampling resolution for a surface attribute function. The maximum sampling resolution specifies an anticipated maximum sampling rate to be used in rendering or otherwise evaluating the surface attribute function. The maximum surface resolution provides an upper limit on the amount of detail to be sampled from the surface attribute function. In a further embodiment, the maximum sampling resolution can be rounded to a computationally convenient value, such as the nearest power of two.

In an embodiment, step 405 specifies the maximum sampling resolution based on a spectral characteristic of the surface attribute function. For example, if the surface attribute function is a projection paint function, then the maximum sampling resolution can be based on the maximum image resolution used by projection paint function. In an embodiment, the maximum sampling resolution corresponds with the minimum size of image pixels projected on to the surface by the projection paint function.

In another embodiment, the attributes of a filtering function that is used to combine and weight surface attribute values from one or more surface regions determines the maximum sampling resolution.

Based on the maximum sampling resolution, step 405 defines a multiresolution cache data structure having one or more resolution levels. In an embodiment, the resolution levels range from a single sample of the surface attribute function up to the maximum sampling resolution. In an embodiment, each resolution level has double the number of samples in each dimension as the next lowest level. For example, if the lowest resolution level of a multilevel cache has a single sample, the next highest level will have a width and height of two samples each, for a total of four samples in this resolution level. The next highest resolution level will have a width and height of four samples each, for a total of sixteen samples. In this embodiment, the dimensions of each resolution level of the multiresolution cache are progressively doubled up to the maximum sampling resolution.

Step 410 divides the surface into quadrilaterals. Step 410 can utilize any technique known in the art to subdivide surfaces into quadrilaterals. In an embodiment, a subdivision surface is divided into faces having three or more sides. Each face is then divided into quadrilaterals. Each quadrilateral has its own local surface coordinate system.

Step 415 selects one of the quadrilaterals of the surface for processing. Step 420 selects one of the resolution levels of the multiresolution cache for evaluation with the selected quadrilateral.

Step 425 divides the selected quadrilateral into surface regions corresponding with the selected cache resolution level. Surface regions can be defined as sub-pixel size micropolygons or other samples of a surface. For example, if the selected cache resolution level has sixteen samples each in width and height, for a total of 256 samples, then the selected quadrilateral is divided into a corresponding arrangement of 256 surface regions.

In a further embodiment, step 425 divides the selected quadrilateral according to an ordering scheme that is consistent regardless of changes in the position, orientation, or shape of the surface. This ordering scheme will always create surface regions from the quadrilaterals in the same order. As a result, surface regions can be identified by the order in which they are created, enabling surface regions to be correctly identified during subsequent retrievals of previously stored surface attribute values. In an alternate embodiment, step 425 assigns a unique identification to each surface region using another algorithm that is capable of consistently assigning the same identification to a surface region regardless of the position, orientation, or shape of the surface.

Step 430 evaluates one or more surface attribute functions for each surface region. The surface attribute functions for each surface region can be evaluated in any manner typically used to evaluate surface attribute functions during rendering or other processing. For example, if the surface attribute function is a projection paint function, images associated with one or more views of one or more reference poses can be projected onto the surface region and combined to determine a color attribute value for a surface region. Surface attribute functions may utilize the position, normal, tangent, or any other geometric property of the surface itself at the point of evaluation as well artistically or procedurally generated data to determine surface attribute values for the surface regions. Surface attributes may include provide optical properties of a surface, such as color, transparency, reflectivity, specularity, and refractivity; visibility or occlusion information; artistically or procedurally generated texture data and noise data in one, two, three, or more dimensions; shadow generation information; simulation forces or attributes; animation data; modeling data; illumination information; and ray tracing path information.

Step 435 stores the surface attribute values for the surface regions of the selected resolution level of the selected quadrilateral in the multiresolution cache. In an embodiment, the multilevel cache includes storage for a set of arrays of surface attribute values, each array corresponding with the surface attribute values at each resolution level for at least one quadrilateral of the surface. In a further embodiment, each quadrilateral includes a unique identification within a surface. This identification is used to assign surface attribute values to the appropriate storage location of the multiresolution cache. As discussed in detail below, the unique identification associated with a quadrilateral of a surface is also used to retrieve previously stored surface attribute values from the multiresolution cache. In a further embodiment, the ordering scheme used to divide quadrilaterals into surface regions is used to assign surface attribute values for a quadrilateral to storage locations within the multiresolution cache.

Following step 435, steps 420 to 435 are repeated as many times as necessary to determine and store surface attribute values for the selected quadrilateral at all of the resolution levels of the multiresolution cache. Once the surface attribute values at all resolution levels of the multiresolution cache have been determined for the selected quadrilateral, steps 415 to 435 are repeated to determine and store surface attribute values at all resolution levels for all of the quadrilaterals of the surface. In additional embodiments, method 400 can be repeated to determine and store surface attribute values for additional surfaces of one or more three-dimensional models.

Figure 5A:
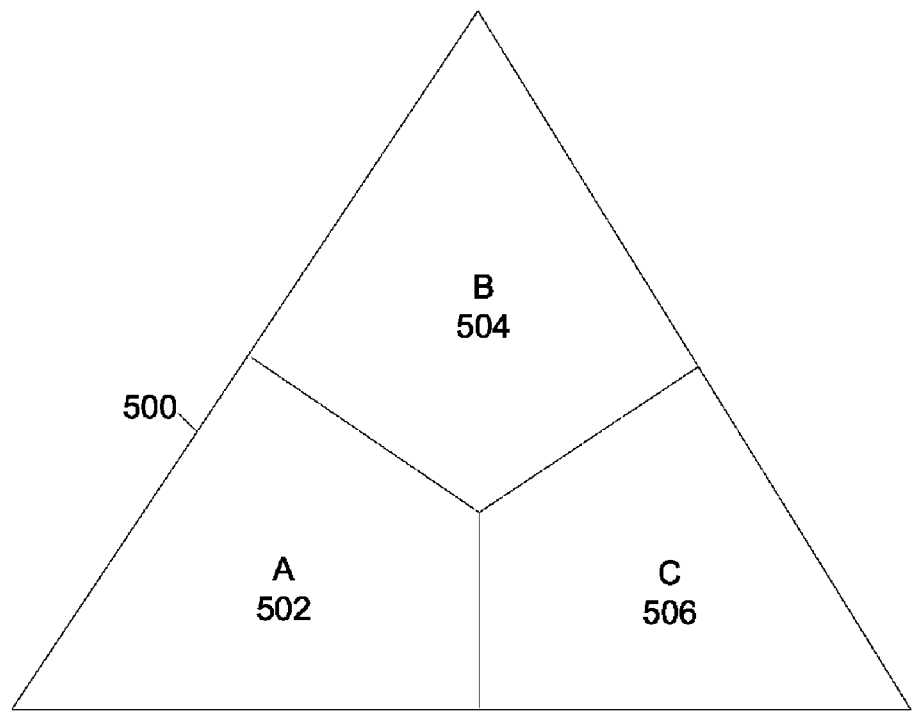
FIGS. 5A-5D illustrate caching surface attribute values of an example subdivision surface according to an embodiment of the invention.

FIGS. 5A-5D illustrate caching surface attribute values of an example subdivision surface according to an embodiment of the invention. FIG. 5A illustrates an example surface 500. Example surface 500 is divided into three quadrilaterals: A 502; B 504; and C 506. At the lowest resolution level of the multiresolution cache, the surface attribute function is sampled once for each quadrilateral.

Figure 5B:
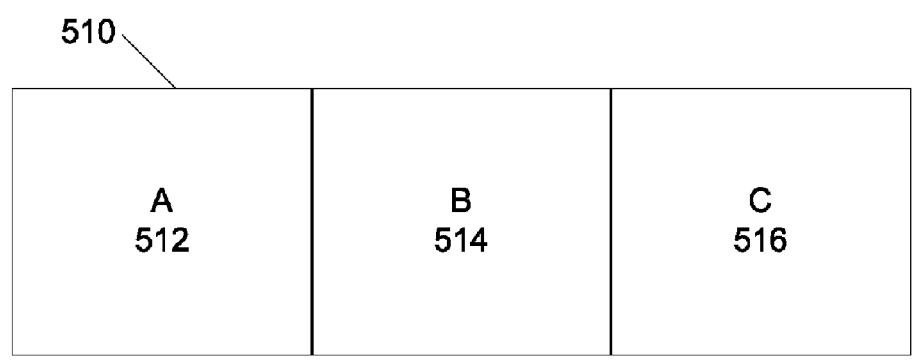

FIG. 5B illustrates the lowest resolution level 510 of a multiresolution cache for example surface 500. Resolution level 510 includes surface attribute values 512, 514, and 516, which correspond with a single sample of the surface attribute function from each of quadrilaterals A 502, B 504, and C 506, respectively. In an embodiment, surface attribute values from two or more quadrilaterals at the same resolution level can be stored in the same resolution level of a single multiresolution cache. For surfaces with a large number of quadrilaterals, this embodiment substantially reduces the overhead associated with managing large numbers of separate multiresolution caches.

Figures 5C, 5D:
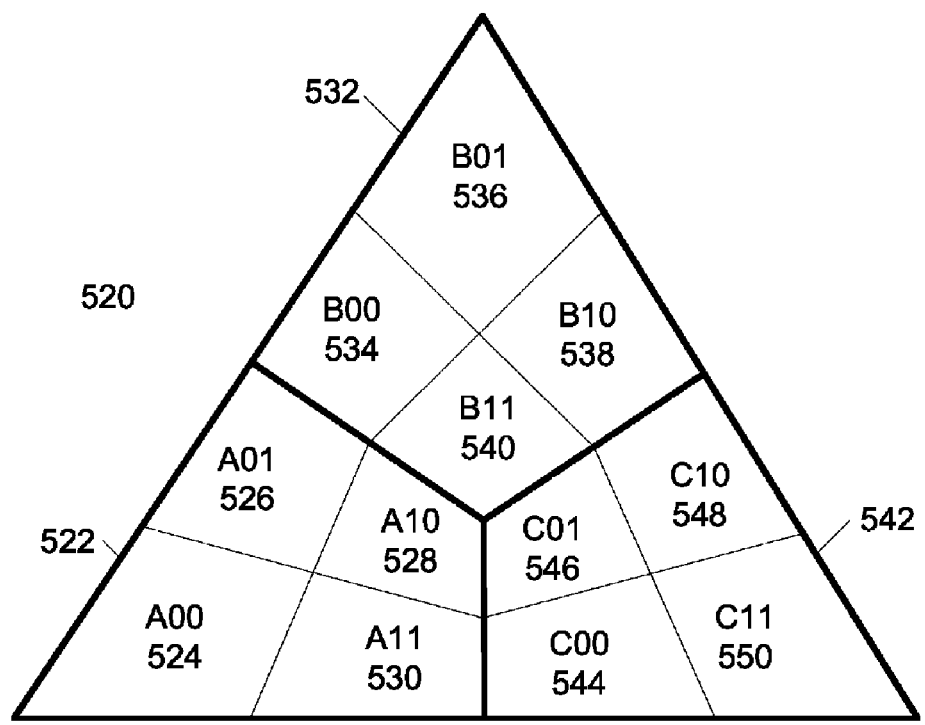

FIG. 5C illustrates example surface 520. Surface 520 corresponds with surface 500 in FIG. 5A. However, in FIG. 5C, the quadrilaterals of surface 520 are being sampled at the next highest resolution level. In this example, surface 520 is sampled with four samples per quadrilateral. Thus, quadrilateral A 522 is divided into surface regions A00 524; A01 526; A10 528; and A11 530. Similarly, quadrilateral B 532 is divided into surface regions B00 534; B01 536; B10 538; and B11 540. Quadrilateral C 542 is divided into surface regions C00 544; C01 546; C10 548; and C11 550.

At this resolution level, the surface attribute function associated with surface 520 is evaluated for each of the four samples for each of the quadrilaterals 522, 532, and 542. A total of twelve surface attribute values in this example are stored in the next resolution level of the multiresolution level. FIG. 5D illustrates the next resolution level 560 of the multiresolution cache. As before, an embodiment of the multiresolution cache stores surface attribute values calculated from all three quadrilaterals at the same resolution in a single resolution level of the multiresolution cache.

It should be noted that each surface attribute value stored in the multiresolution cache is associated with a single, fixed surface region of the surface. Additionally, surface attribute values that are contiguous in the multiresolution cache are not necessarily contiguous on the surface itself or even from contiguous surfaces. For example, surface attribute value B01 562 in resolution level 560 of the multiresolution cache is contiguous with surface attribute values A10 564 and A11 566. However, in surface 520, corresponding surface region B01 536 is not contiguous with surface regions A10 528 and A11 530. Additionally, the multiresolution cache can include surface attribute values from more than one surface. Additionally, the surface attribute values stored at each resolution level, such as the surface attribute values stored in resolution level 560, may be derived from different subdivision levels or levels of detail of their respective surfaces.

Method 400 is capable of simplifying the evaluation of surface attribute functions from a global operation, dependent upon the relationships between numerous surface regions, to a local operation confined to each surface region. In a further embodiment, the method 400 can determine the surface attribute value for a selected surface region by sampling surface attribute values within the selected surface region and optionally those within adjacent surface regions. As a result, the cached surface attribute value for a surface region includes the influence of adjacent surface regions on a selected surface region. When the surface attribute value for the selected surface region is later retrieved from the multiresolution cache for reuse during rendering or other operations, there is no need for further consideration of the influence of adjacent surface regions, as their influence, if any, has already been accounted for. Moreover, rendering and other operations evaluating the surface region may not require any information about the arrangement of adjacent surface regions.

Figure 6:
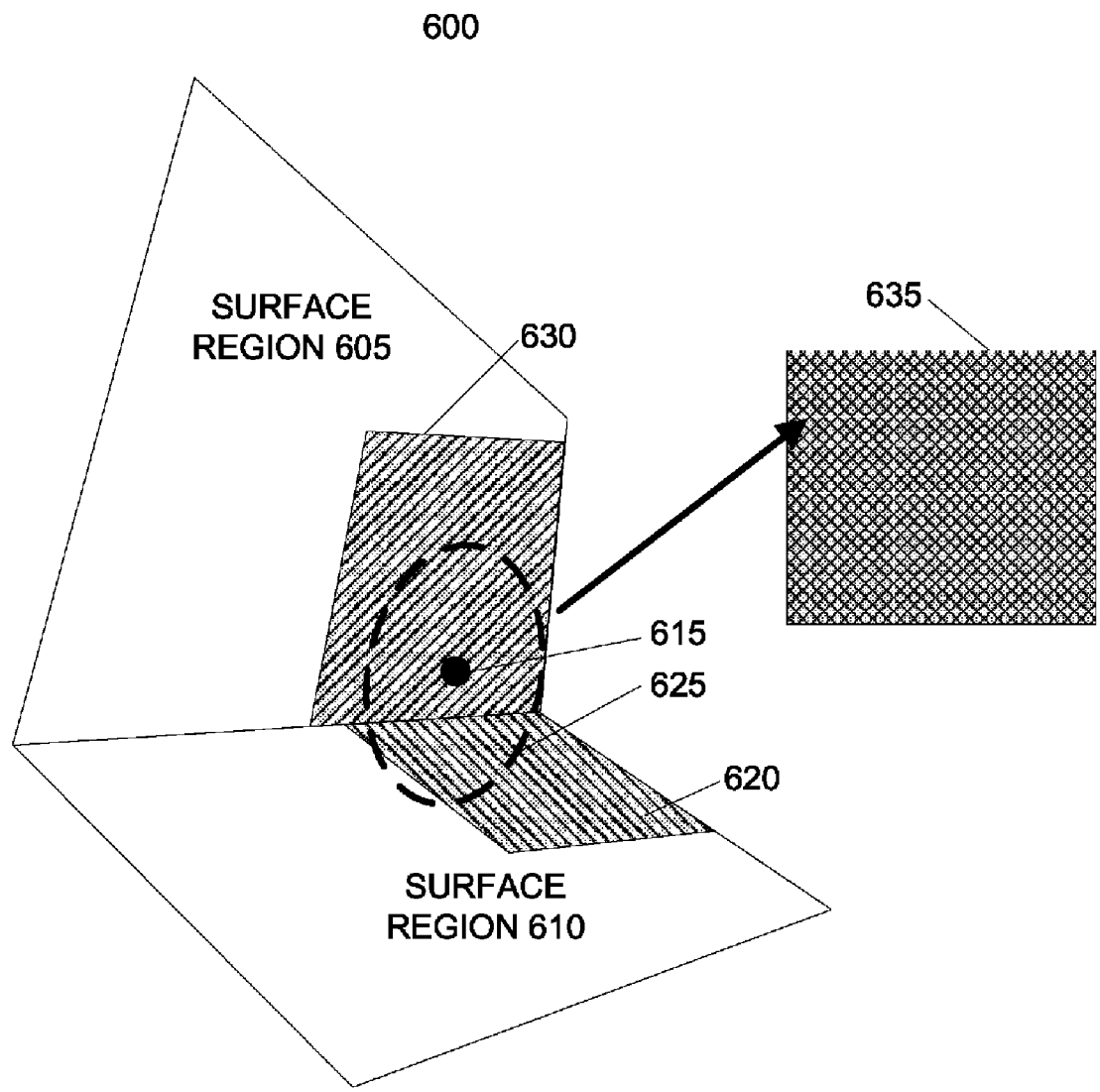
FIG. 6 illustrates an example of sampling surface attribute values for caching according to an embodiment of the invention.

FIG. 6 illustrates an example of sampling surface attribute values for caching according to an embodiment of the invention. During step 430 of method 400, the surface attribute value of a quadrilateral or other portion of a surface is determined by evaluating a surface attribute function at one or more surface regions. If the value of the surface attribute function varies over the quadrilateral, a filtering function may be used to determine single surface attribute value at a sample point for each surface region based on the combination of surface attribute values surrounding the sample point. In an embodiment, the influence of the filtering function may spill over into an adjacent surface region.

FIG. 6 illustrates an example surface 600. In this example, surface 600 has been divided into surface regions 605 and 610, based upon the selected resolution level used to sample the surface attribute function. To determine the surface attribute value for surface region 605, a sample point 615 is selected. A filtering function centered around sample point 615 evaluates surface attribute values within filter area 625 to determine a combined surface attribute value.

In this example, the filter area 625 extends past the boundary of surface region 605 to cover a portion of surface region 610. In an embodiment, the filtering function uses surface attribute values within the filter area 625 from both surface regions 605 and 610 to determine the combined surface attribute value for sample point 615. In this example, a first shaded portion 630 represents one or more surface attribute values associated with surface region 605. Similarly, a second shaded portion 620 represents one or more surface attribute values associated with surface region 610. The filtering function evaluates surface attribute values in the shaded regions 620 and 630 and enclosed by filter area 625 to determine a combined surface attribute value 635 for sample point 615. The combined surface attribute value 635 can be stored in a resolution level of a multiresolution cache.

Figure 7:
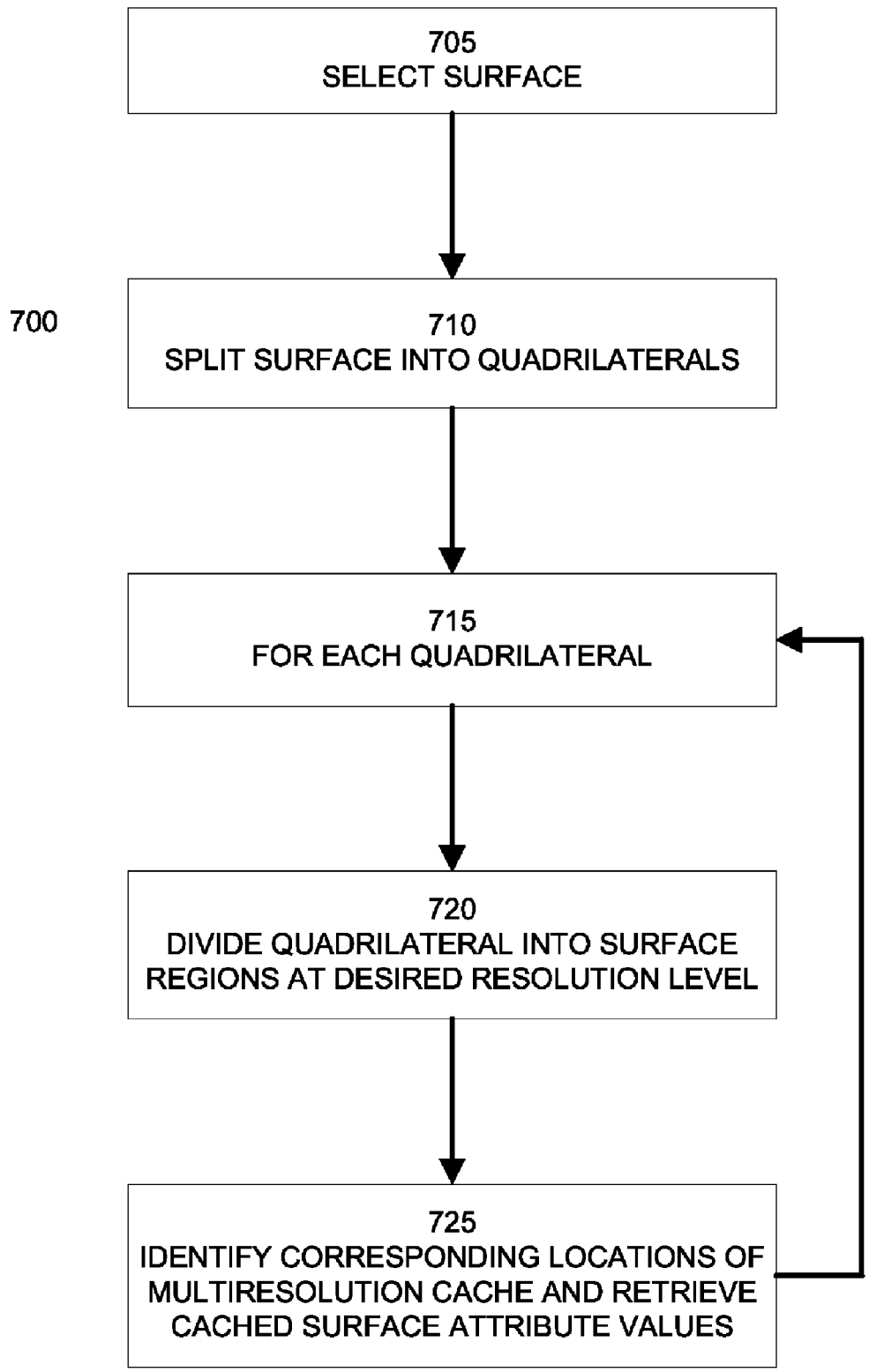
FIG. 7 illustrates a method of evaluating surface attribute values for a surface without a global surface coordinate system according to an embodiment of the invention.

FIG. 7 illustrates a method 700 of evaluating surface attribute values for a surface without a global surface coordinate system according to an embodiment of the invention. Step 705 selects a surface for evaluation. Step 710 splits the surface into one or more quadrilaterals. In an embodiment, step 710 may first divide the surface into a set of faces having arbitrary shapes. The set of faces is then further divided into quadrilaterals. In an embodiment, step 710 provides the quadrilateral with a unique identifier. This identifier corresponds to the identifier associated with the quadrilateral in method 400, so that the quadrilaterals created in step 710 correspond with the quadrilaterals previously created and evaluated in method 400. Step 715 selects one of the quadrilaterals for evaluation.

Step 720 divides the selected quadrilateral into surface regions. In an embodiment, step 720 is provided with a desired resolution level to use in dividing the quadrilateral into surface regions. In a further embodiment, an application such as a renderer provides the desired resolution level for the quadrilateral based on the quadrilateral's projected coverage of one or more pixels.

In an embodiment, step 720 divides the selected quadrilateral into surface regions using an ordering scheme similar to that used in method 400. The surface regions of a selected quadrilateral do not necessarily have to correspond with the surface regions previously created and evaluated in method 400, provided that the local coordinate system of the selected quadrilateral is consistent with the local coordinate system of the corresponding quadrilateral created and evaluated in method 400.

Step 725 identifies the storage locations of the multiresolution cache corresponding with the surface regions created in step 720. In an embodiment, step 725 first uses the identification associated with the quadrilateral to select the appropriate multiresolution cache.

Step 720 matches the desired resolution level with a resolution level of the multiresolution cache. In a further embodiment, if surface attribute values from two or more quadrilaterals are stored in the same resolution level of the multiresolution cache, step 725 utilizes the selected quadrilateral's identification to select an appropriate portion of the selected resolution level of the multiresolution cache that includes cached surface attribute values for the selected quadrilateral.

Step 725 then matches surface regions with cached surface attribute values. In an embodiment, cached surface attribute values are arranged according to the ordering scheme used to create surface regions in methods 400 and 700. Thus, an embodiment of step 725 can retrieve and assign cached surface attribute values to surface regions according to the ordering scheme. As the ordering scheme is consistent between method 400 and method 700, the surface attribute value for a given surface region stored in method 400 will be retrieved and assigned to the same surface region in method 700.

In an embodiment, if the selected resolution level of the multiresolution cache and the desired resolution level used to divide the selected quadrilateral into surface regions are exactly the same, then there will be a one to one correspondence between cached surface attribute values and surface regions. As a result, cached surface attribute values can be directly assigned to surface regions without interpolation.

In a further embodiment of method 400, cached surface attribute values for a quadrilateral are arranged within their respective resolution level according to their positions within the quadrilateral. In this embodiment, step 725 selects a resolution level of the multiresolution cache that is equal or greater than the desired resolution level, which may be based on the size of the quadrilateral when projected into the image plane, based on the size of a pixel or sub-pixel region in the image plane projected on to the surface, or any arbitrary desired sampling rate and filter size. If these resolution levels are not equal, then step 725 interpolates between adjacent cached surface attribute values to determine a surface attribute value for each region.

Following the assignment of surface attribute values to surface regions of the selected quadrilateral, method 700 proceeds to step 715 to select another unprocessed quadrilateral of the surface. Steps 715 to 725 can be repeated as often as necessary to retrieve cached surface attribute values for all of the surface regions of all of the quadrilaterals of the selected surface. The retrieved cached surface attribute values can be used in the same manner as surface attribute values determined directly from surface attribute functions.

FIG. 8 illustrates an example computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more processors 1600, and memory storage devices, such as a random access memory (RAM) 1700, disk drives 1800, and system bus 1900 interconnecting the above components. Processors 1600 can include one or more general purpose processors and optional special purpose processors for processing video data, audio data, or other types of data. RAM 1700 and disk drive 1800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of caching at least one surface attribute value of a function at a plurality of surface points, the method comprising:
   dividing a first surface into a first plurality of surface regions, wherein the first plurality of surface regions includes at least a first surface region having a first local surface coordinate system and a second surface region having a second local surface coordinate system;
   evaluating at least one surface attribute function at a first resolution level to determine at least the one surface attribute value for at least a portion of the first plurality of surface regions including the first and second surface regions;
   storing the surface attribute value for the first surface region in a first portion of a multiresolution cache according to the first local surface coordinate system; and
   storing the surface attribute value for the second surface region in a second portion of the multiresolution cache according to the second local surface coordinate system;
   wherein the first and second surface regions have different local surface coordinate systems;
   wherein evaluating the surface attribute function to determine the surface attribute value for the first surface region comprises:
   applying a two-dimensional filtering function having a filter area to the first surface region, wherein the filter area includes a first portion covering at least part of the first surface region and a second portion covering at least part of a contiguous surface region different from the first surface region;
   wherein the filtering function is adapted to combine surface attribute values from the first surface region using the first local surface coordinate system and from the contiguous surface region using a different local surface coordinate system that is different from the first local surface coordinate system.

2. The method of claim 1, wherein:
   dividing the first surface into the first plurality of surface regions comprises an ordering scheme adapted to specify the first plurality of surface regions in a consistent order; and
   storing the surface attribute values for the first plurality of surface regions comprises storing the surface attribute values for at least the portion of the first plurality of surface region in storage locations of the multiresolution cache corresponding with the consistent order.

3. The method of claim 1, wherein the first surface is selected from a group consisting of: a subdivision hierarchy of meshes converging at its limit to a subdivision surface; an implicit surface defined by an isosurface of a second function; a point set surface defined by a set of points; and a fractal surface.

4. The method of claim 1, wherein the first surface comprises at least two surfaces.

5. The method of claim 4, wherein the two surfaces are geometrically discontiguous.

6. The method of claim 5, wherein the first and second portions of the multiresolution cache are contiguous.

7. The method of claim 1, wherein the surface attribute values are selected from a group consisting of:

optical surface attributes values; occlusion information surface attribute values; illumination information surface attribute values; modeling information surface attribute values; and ray tracing path information surface attribute values.

8. The method of claim 1, wherein the surface attribute values are selected from a group consisting of:

artistically generated surface attribute values; procedurally generated surface attribute values; and surface attribute values generated using the output of a rendering operation.

9. The method of claim 1, further comprising:

evaluating the surface attribute function at a second resolution level to determine at least one surface attribute value for at least a second portion of the first plurality of surface regions including the first and second surface regions;

storing the surface attribute value at the second resolution level for the first surface region in a third portion of a multiresolution cache according to the first local surface coordinate system; and storing the surface attribute value at the second resolution level for the second surface region in a fourth portion of the multiresolution cache according to the second local surface coordinate system.

10. The method of claim 1, wherein the stored surface attribute value for the first surface region is associated with the first local surface coordinate system in the multiresolution cache and includes a filtered value based in part on the different local surface coordinate system.

11. The method of claim 1, wherein the filtering function is adapted to combine first surface attribute values determined from a first surface attribute function defined using the first local surface coordinate system and second surface attribute values determined from a second surface attribute function defined using the different local surface coordinate system.

* * * * *